(12) United States Patent
Moceyunas et al.

(10) Patent No.: US 12,175,176 B2
(45) Date of Patent: Dec. 24, 2024

(54) FAST SYNTHESIS OF LOGICAL CIRCUIT DESIGN WITH PREDICTIVE TIMING

(71) Applicant: Synopsys, Inc., Mountain View, CA (US)

(72) Inventors: Peter Moceyunas, Los Altos, CA (US); Jiong Luo, Morgan Hill, CA (US); Luca Amaru, Santa Clara, CA (US); Casey The, Cupertino, CA (US); Jovanka Ciric Vujkovic, Mountain View, CA (US); Patrick Vuillod, St. Bernard du Touve (FR)

(73) Assignee: Synopsys, Inc., Sunnyvale, CA (US)

( * ) Notice: Subject to any disclaimer, the term of this patent is extended or adjusted under 35 U.S.C. 154(b) by 146 days.

(21) Appl. No.: 17/693,236

(22) Filed: Mar. 11, 2022

(65) Prior Publication Data

US 2022/0300688 A1    Sep. 22, 2022

Related U.S. Application Data

(60) Provisional application No. 63/162,160, filed on Mar. 17, 2021.

(51) Int. Cl.
*G06F 30/327* (2020.01)
*G06F 30/323* (2020.01)
*G06F 119/12* (2020.01)

(52) U.S. Cl.
CPC .......... *G06F 30/327* (2020.01); *G06F 30/323* (2020.01); *G06F 2119/12* (2020.01)

(58) Field of Classification Search
CPC ... G06F 30/323; G06F 30/327; G06F 2119/12
See application file for complete search history.

(56) References Cited

U.S. PATENT DOCUMENTS

| 5,805,462 | A | * | 9/1998 | Poirot | G06F 30/30 716/105 |
|---|---|---|---|---|---|
| 5,956,497 | A | * | 9/1999 | Ratzel | G06F 30/30 716/108 |

(Continued)

OTHER PUBLICATIONS

Mishchenko et al., "Faster Logic Manipulation for Large Designs". https://people.eecs.berkeley.edu/~alanmi/publications/2013/iwls13_dsd.pdf (Year: 2013).*

(Continued)

*Primary Examiner* — Jack Chiang
*Assistant Examiner* — Aric Lin
(74) *Attorney, Agent, or Firm* — Fenwick & West LLP

(57) ABSTRACT

A system receives a logic design of a circuit of an integrated circuit and apply a reduced synthesis process to the logical design of the integrated circuit. The reduced synthesis process is less computation intensive compared to the optimized digital implementation synthesis process and generates a netlist having suboptimal delay. The system provides the generated netlist as input to a timing analysis that alters the standard delay computation (through scaling and other means) to predict the timing of a fully optimized netlist. The reduced synthesis process has faster execution time compared to the optimized digital implementation synthesis process but results in comparable performance, power and area that is within a threshold of the results generated using optimized digital implementation synthesis process.

17 Claims, 7 Drawing Sheets

(56) References Cited

U.S. PATENT DOCUMENTS

| | | | | |
|---|---|---|---|---|
| 6,170,080 B1* | 1/2001 | Ginetti | G06F 30/392 | 716/122 |
| 6,363,515 B1* | 3/2002 | Rajgopal | G06F 30/33 | 716/109 |
| 6,496,966 B1* | 12/2002 | Barney | G06F 30/392 | 716/113 |
| 6,751,579 B1* | 6/2004 | Misheloff | G06F 30/33 | 703/2 |
| 6,789,248 B1* | 9/2004 | Lu | G06F 30/39 | 716/113 |
| 6,836,877 B1* | 12/2004 | Dupenloup | G06F 30/30 | 716/132 |
| 7,013,438 B1* | 3/2006 | Saldanha | G06F 30/327 | 716/122 |
| 7,191,417 B1* | 3/2007 | Luo | G06F 30/30 | 716/136 |
| 7,257,795 B1* | 8/2007 | Fung | G06F 30/34 | 716/128 |
| 7,337,100 B1* | 2/2008 | Hutton | G06F 30/39 | 716/108 |
| 7,500,216 B1* | 3/2009 | Blunno | G06F 30/327 | 716/104 |
| 7,587,688 B1* | 9/2009 | Van Antwerpen | G06F 30/30 | 716/132 |
| 7,694,266 B1* | 4/2010 | Sankaralingam | G06F 30/327 | 327/291 |
| 7,739,630 B1* | 6/2010 | Chen | G06F 30/39 | 716/136 |
| 7,979,834 B1* | 7/2011 | Duong | G06F 30/3312 | 716/108 |
| 8,050,904 B2* | 11/2011 | Bhadra | G06F 30/3312 | 716/108 |
| 8,302,041 B1* | 10/2012 | Chan | G06F 30/347 | 716/132 |
| 8,375,345 B1* | 2/2013 | Barowski | G06F 30/30 | 716/132 |
| 8,423,939 B1* | 4/2013 | Hurst | G06F 30/327 | 716/108 |
| 8,504,970 B1* | 8/2013 | Malhotra | G06F 30/3312 | 716/108 |
| 8,549,450 B1* | 10/2013 | Burstein | G06F 30/3312 | 716/108 |
| 8,826,215 B1* | 9/2014 | Alpert | G06F 30/3947 | 716/108 |
| 8,898,610 B1* | 11/2014 | Tagore-Brage | G06F 30/30 | 716/119 |
| 8,977,995 B1* | 3/2015 | Arora | G06F 30/327 | 716/108 |
| 10,133,839 B1* | 11/2018 | Vanukuri | G06F 30/30 | |
| 10,198,551 B1* | 2/2019 | Farshidi | G06F 30/3312 | |
| 10,296,686 B1* | 5/2019 | Krishnamurthy | G06F 30/327 | |
| 10,599,882 B1* | 3/2020 | Werkheiser | G06F 30/392 | |
| 10,860,764 B1* | 12/2020 | Ding | G06F 30/392 | |
| 2002/0184607 A1* | 12/2002 | Alpert | G06F 30/392 | 716/114 |
| 2003/0093765 A1* | 5/2003 | Lam | G06F 30/30 | 716/108 |
| 2004/0015803 A1* | 1/2004 | Huang | G06F 30/39 | 716/103 |
| 2004/0230921 A1* | 11/2004 | Hathaway | G06F 30/327 | 716/132 |
| 2004/0243371 A1* | 12/2004 | Gutkovich | G01R 31/318357 | 703/14 |
| 2004/0243953 A1* | 12/2004 | Ramachandran | G06F 30/3312 | 716/112 |
| 2006/0095879 A1* | 5/2006 | Brahme | G06F 30/398 | 716/113 |
| 2007/0143723 A1* | 6/2007 | Kawakami | G06F 30/3312 | 716/113 |
| 2008/0065923 A1* | 3/2008 | Arsovski | G06F 30/3312 | 713/400 |
| 2011/0099528 A1* | 4/2011 | Miyaoka | G06F 30/30 | 716/108 |
| 2012/0017186 A1* | 1/2012 | Amundson | G06F 30/30 | 716/108 |
| 2012/0210286 A1* | 8/2012 | Abdelhamid | G06F 30/327 | 716/113 |
| 2013/0346937 A1* | 12/2013 | Kennedy | G06F 30/398 | 716/122 |
| 2015/0185283 A1* | 7/2015 | Mittal | G01R 31/3177 | 714/731 |
| 2016/0321388 A1* | 11/2016 | Shin | G06F 30/39 | |
| 2017/0068772 A1* | 3/2017 | Nagaraj | H03K 5/13 | |
| 2017/0083659 A1* | 3/2017 | Liu | G06F 30/398 | |
| 2017/0091372 A1* | 3/2017 | Kalashnikov | G06F 30/398 | |
| 2017/0132341 A1* | 5/2017 | Berry | G06F 30/394 | |
| 2018/0181684 A1* | 6/2018 | Fredenburg | G06F 30/30 | |
| 2018/0365360 A1* | 12/2018 | Foreman | G06F 17/18 | |
| 2019/0220553 A1* | 7/2019 | Renau | G06F 30/343 | |
| 2019/0320164 A1* | 10/2019 | Salahieh | H04N 13/156 | |
| 2020/0104452 A1* | 4/2020 | Geva | G06F 30/30 | |
| 2020/0135637 A1* | 4/2020 | Peng | H01L 21/76877 | |
| 2022/0187367 A1* | 6/2022 | Yi | G01R 31/318328 | |

OTHER PUBLICATIONS

ANSYS. "Ansys PowerArtist: Analyze, Profile and Reduce RTL Power." Ansys.com, 2022, 6 pages, [Online] [Retrieved Oct. 5, 2022], Retrieved from the Internet <URL:https://www.ansys.com/products/semiconductors/ansys-powerartist>.

Harris, D. "Logical Effort: Designing for Speed on the Back of an Envelope." Presentation: Based on A Book by Ivan Sutherland, Bob Sproull, and David Harris, Stanford University, Aug. 1998, 38 slides.

Sutherland, I. E et al. "Logical Effort: Designing Fast CMOS Circuits." Draft, Morgan Kaufmann Publishers, Inc., May 19, 1998, pp. 1-223.

Sutherland, I. E. et al. "Logical Effort: Designing for Speed on the Back of an Envelope." Advanced Research in VLSI: UC Santa Cruz, Apr. 1991, pp. 1-16.

Sutherland, I. E. et al. "Logical Effort: Designing for Speed on the Back of an Envelope." IEEE Advanced Research in VLSI, C. Sequin, ed., MIT Press, 1991, pp. 1-17.

Sutherland, I. et al. "1.3: Multistage Logic Networks." Logical Effort: Designing Fast CMOS Circuits, 1999, pp. 13-20, 51-53.

SYNOPSYS. "SpyGlass Power." Synopsys.com, 2022, 7 pages, [Online] [Retrieved Oct. 5, 2022], Retrieved from the Internet <URL:https://www.synopsys.com/verification/static-and-formal-verification/spyglass/spyglass-power.html>.

\* cited by examiner

FAST SYNTHESIS OF LOGICAL CIRCUIT DESIGN WITH PREDICTIVE TIMING

TECHNICAL FIELD

The present disclosure relates to the design of integrated circuits and more specifically to fast synthesis of a logical circuit design with predictive timing to achieve high accuracy area, power, and timing correlation.

BACKGROUND

Designing a very large scale integrated (VLSI) circuit is a complex process. At a high level the design process is divided into two parts: the front end or logical design and the back end or physical design. These two parts are typically performed by different people. The front end designer develops the logical design using a hardware description language (HDL) description of the design. The front end designer uses the HDL to develop a register transfer level (RTL) description for the design. The RTL is synthesized into a gate level netlist.

The back end designer takes the gate level netlist and works on the physical aspects of the design implementation, including floorplanning, placement, and routing. A floorplanned design includes a core boundary, input/output pads, placement of cells and global routing result. The fully implemented physical design includes optimization of the physical design and high quality placement of cells and detailed routing. The completion of fully implemented physical design is a highly computational resource intensive process. If there are any issues identified in the area, power, or timing of the fully implemented physical design, the logical circuit design may have to be modified and the entire process repeated, which could happen multiple times. This results in significant consumption of computational resources.

SUMMARY

The full design process, which will be referred to as an optimized digital implementation synthesis process, begins with a logical design of an integrated circuit and, through a series of steps, generates a fully synthesized physical design of the integrated circuit. Embodiments receive a logic design of a circuit of an integrated circuit and apply a reduced synthesis process to the logical design of the integrated circuit. The reduced synthesis process is less computation intensive compared to the optimized digital implementation synthesis process and generates a netlist having suboptimal delay. The system provides the generated netlist as input to a timing prediction model that determines delay as a function of timing context of gates and nets Timing prediction can be based on logical effort delay or through standard timing delay modeling but with context specific scaling of input parameters. The system provides, based on the timing prediction model, an estimate of timing for the logic design of the circuit. The reduced synthesis process has faster execution time compared to the optimized digital implementation synthesis process but results in comparable performance, power and area (PPA) that is within a threshold of the results generated using optimized digital implementation synthesis process.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure related to synthesis of a logical design of an integrated circuit. Circuit designers perform early design exploration of various architectures to finalize the design of the circuit. To evaluate various architectures, circuit designers need feedback on power, performance, and area of the logic design. Current techniques for providing the feedback on power, performance, and area of a logic design perform an optimal digital implementation synthesis that creates a fully placed, optimized, and legalized netlist from the logic design. The optimal digital implementation synthesis process performs several operations on the logic design to optimize different design structures and physical information. Furthermore, the optimal digital implementation synthesis process performs multiple passes of several steps and several iterations of each pass. As a result, the optimal digital implementation synthesis process is computationally expensive and slow process.

Embodiments perform a reduced synthesis process that performs a subset of operations performed by an optimized digital implementation synthesis. The reduced synthesis process may skip certain operations that are performed by the optimized digital implementation synthesis. Furthermore, the reduced synthesis process performs a single pass for several operations compared to the optimized digital implementation synthesis which performs multiple passes. Furthermore, the reduced synthesis process performs fewer iterations of each pass compared to corresponding operations performed by the optimal digital implementation synthesis process. As a result, the reduced synthesis process generates a suboptimal netlist, for example, a netlist that would return highly pessimistic delays if calculated using standard techniques for determining delays. Embodiments use a timing prediction model that is a delay determination technique different from those conventionally used for optimal digital implementation synthesis process. In an embodiment, the timing prediction model used is a logical effort based timing prediction model. The use of timing prediction model results in delay predictions that are within a threshold of the optimal digital implementation synthesis process. Accordingly, the reduced synthesis process achieves high accuracy area, power, and timing correlation compared to the optimized digital implementation synthesis process with turnaround runtime that may be over three times faster than the optimized digital implementation synthesis process.

Accordingly, embodiments allow the frontend designer to explore different logical designs with respect to area, power, and timing behavior. This can produce better quality designs and reduce the overall design cycle. To achieve this, the use of a reduced synthesis process reduces the amount of compute resources required compared to the full implementation-quality synthesis process.

Figure 7:
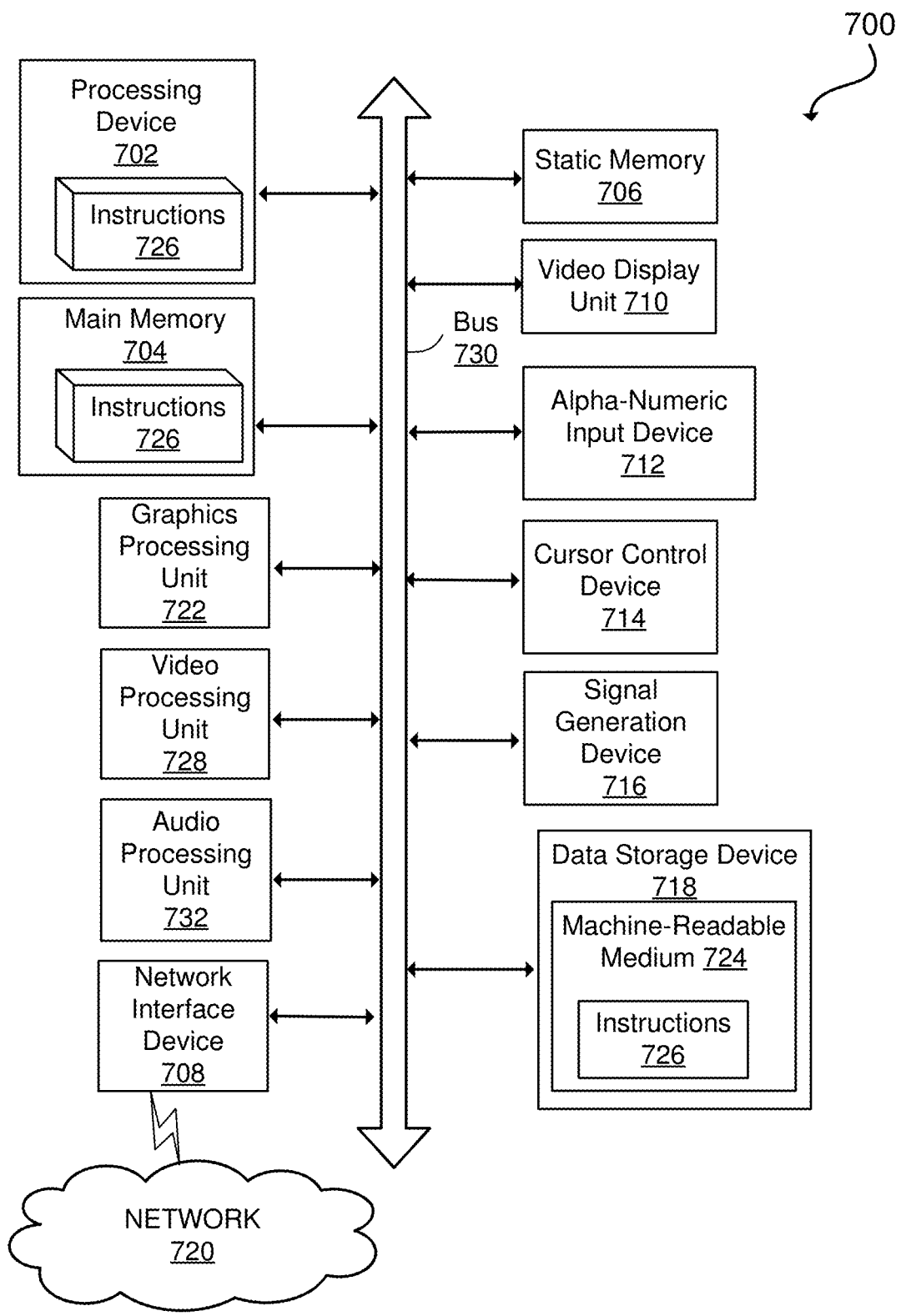
FIG. 7 depicts an abstract diagram of an example computer system in which embodiments of the present disclosure may operate.

The various processes illustrated herein may be performed by a system, for example, a computing system configured to perform various EDA operations such as the operations described in FIG. 7. In an embodiment, the system includes modules such as a reduced synthesis module for performing reduced synthesis process and a timing prediction module to determine timing predictions. Other embodiments may have more or fewer modules.

Figure 1:
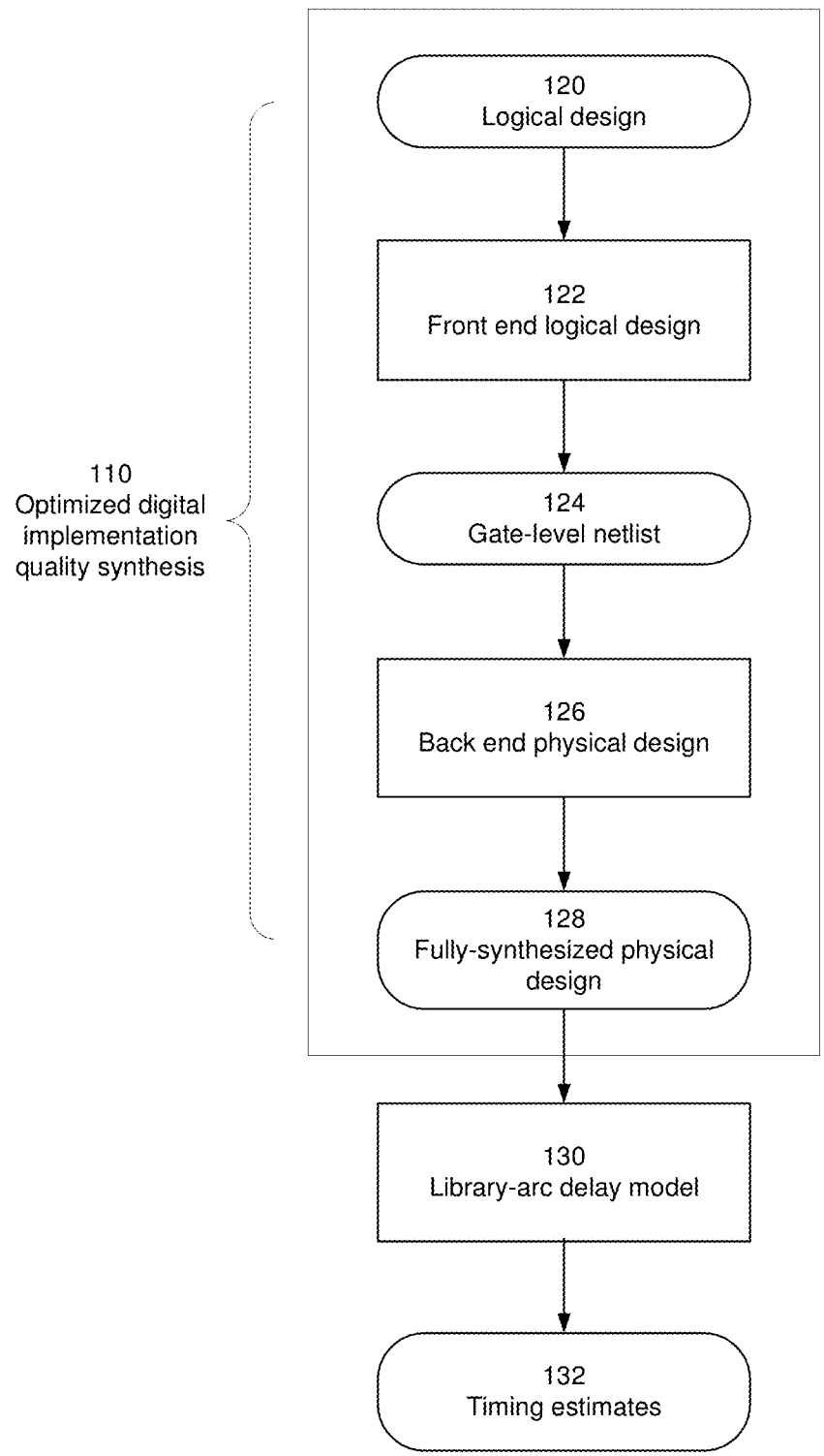
FIG. 1 depicts a flowchart for an optimized digital implementation synthesis process.

FIG. 1 depicts a flowchart for an optimized digital implementation synthesis flow. The system receives a logical design 120 as input, for example, RTL input. The logical design primarily describes the functioning of the integrated circuit, but without much information about how these functions will be physically implemented. The front end design process 122 is applied to the logical design to generate a gate-level netlist 124. A back end design process 126 is applied to the gate-level netlist to generate the fully-synthesized physical design 128. The fully-synthesized physical design identifies the specific cells used in the physical integrated circuit, where those cells are physically placed on the integrated circuit and how electrical connections between cells are physically routed on the integrated circuit. Cells are predesigned circuits that form the building blocks of the physical design. This flow 110, and substeps within the flow, are repeated many times as the circuit design is iteratively improved. The process generates a library-arc delay model 130 and also generates timing estimates 132. This design process is described in more detail in FIG. 6 below.

The optimized digital implementation synthesis performs various steps including area-based logic optimization, timing driven logic optimization and area recovery, design for testability and scan, placement, buffer/inverter tree insertion, skew and physical timing optimization, area/leakage recovery, power optimization, legalization and so on. The optimized digital implementation synthesis performs multiple passes of various stages including wirelength, and timing/congestion driven placement, buffer/inverter tree insertion, clock skew optimization, timing optimization, area and leakage recovery power optimization, legalization and so on to achieve an optimized circuit design. In each pass, the optimized digital implementation synthesis may perform several iterations, for example, until certain criteria based on predetermined thresholds are met. As a result, the optimized digital implementation synthesis flow creates a placed, optimized and legalized netlist. Circuit designers analyze the generated netlist to get estimates of performance, power and area. The circuit designers use the estimates of performance, power and area as feedback and may iteratively modify the circuit design and repeat the above process.

Overall Process

Figure 2:
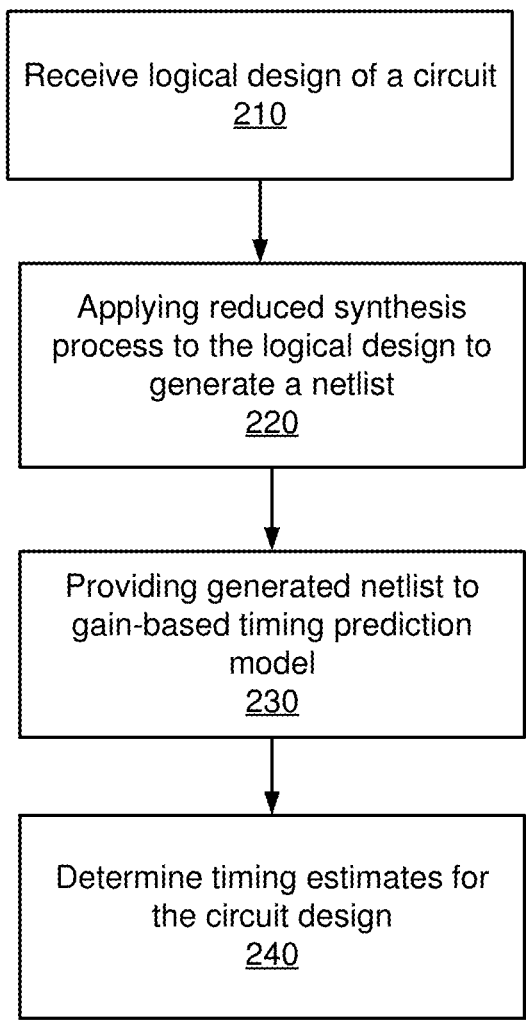
FIG. 2 depicts a flowchart for the overall process based on reduced synthesis process according to an embodiment.

FIG. 2 depicts a flowchart for the overall process based on reduced synthesis flow according to an embodiment. The system receives 210 a logical design of a circuit. The system applies 220 a reduced synthesis process to the logical design to generate a netlist. The reduced synthesis process generates a netlist having suboptimal delay through one or more portions of the netlist. The netlist generated is sub-optimal with respect to delay which is partly due to sub-optimal sizing of gates and buffering of wires. As a result, use of standard models for delay during timing analysis produces delay values that are very pessimistic as compared to delay values computed when the design is fully optimized. Therefore, the system according to various embodiments uses timing prediction model for delay modeling. The timing prediction model approximates the sizing and buffering effects of optimized digital implementation synthesis process.

The system provides 230 the generated netlist to a timing prediction model, further described in detail herein. The timing prediction model determines delay as a function of timing context of cells and nets. The timing prediction model provides accurate predictions of delays if the gates on the path are properly sized and buffered. The system determines 240 timing estimates for the circuit design based on the output of the timing prediction model.

The approach shown in FIG. 2 provides for fast synthesis based on a logical design of an integrated circuit. The fast synthesis process provides fast estimates of power, performance (timing), area or other metrics for a logical design. For example, the fast synthesis process may run at least three times faster than the optimized digital implementation synthesis process. However, the estimated area, power, and timing generated using the netlist obtained from the reduced synthesis flow are within a threshold of the corresponding measures determined by the optimized digital implementation synthesis process. Accordingly, the reduced synthesis process obtains accurate measures of area, power, and timing much faster and with less computational resources.

This allows the front end designer to explore different logical designs. The designer may use these fast estimates to identify problem areas within a design and address them in the logical design phase. Alternatively, the designer may make changes to a logical design and use the fast estimates to understand the impact of the changes on the metrics: If I make this change, what happens to a certain metric? If I make this other change, then what happens? Etc.

Reduced Synthesis Process

Figure 3:
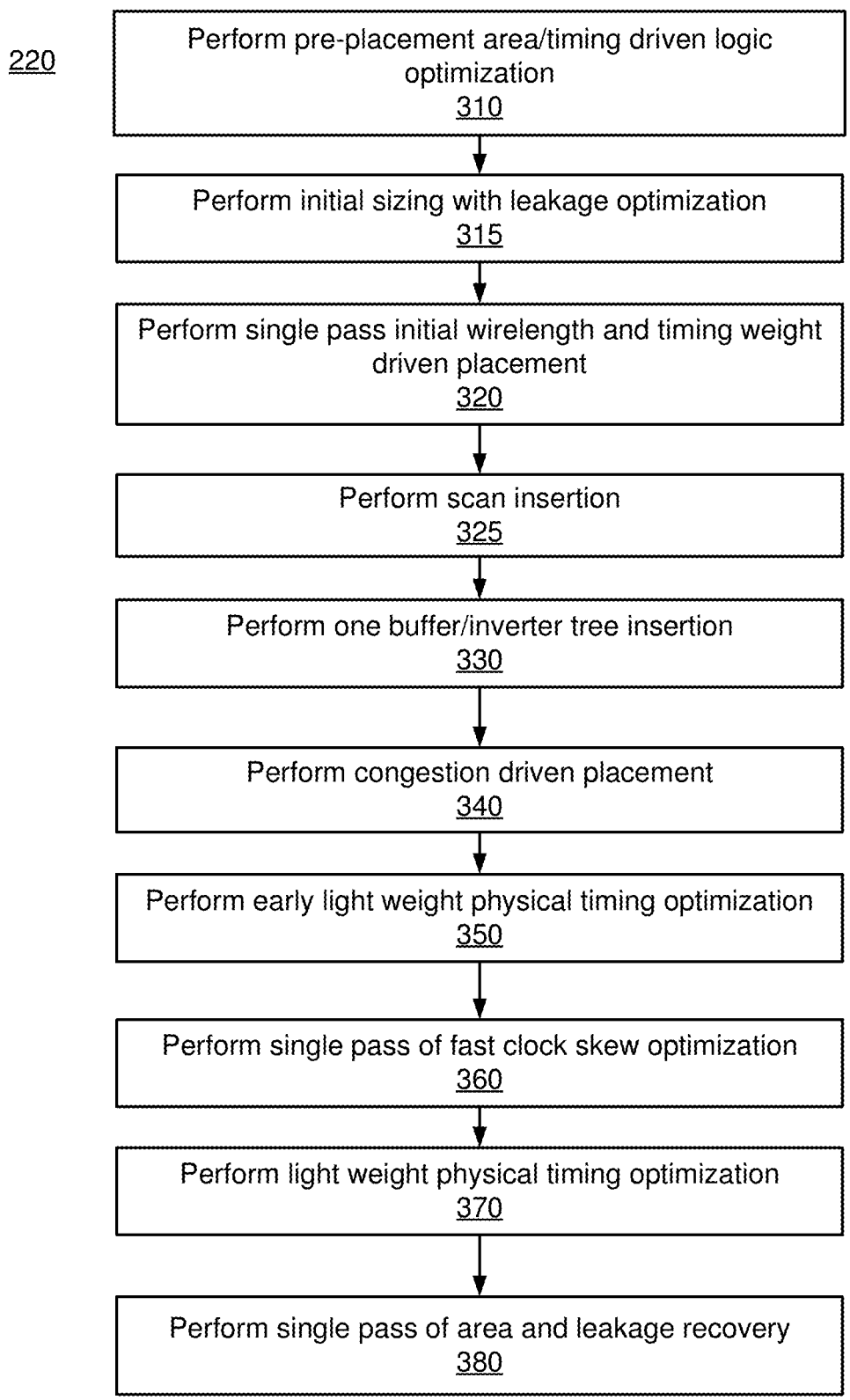
FIG. 3 depicts a flowchart for a reduced synthesis flow according to an embodiment.

FIG. 3 depicts a flowchart for a reduced synthesis process according to an embodiment. The system performs various steps in the reduced synthesis process including: pre-placement area/timing driven logic optimization 310; initial sizing with leakage optimization 315; single pass of initial wirelength and timing weight driven placement 320; scan insertion 325; single pass of buffer/inverter tree insertion 330; single pass of congestion driven placement 340; early light weight physical timing optimization 350; single pass of fast clock skew optimization 360; low effort (light weight) physical timing optimization 370; and single pass of area and leakage recovery 380. In one embodiment, the operations are performing in the order shown in FIG. 3. In other embodiments, certain operations may be performed in an order different from that indicated in FIG. 3. Other embodiments may perform more or fewer operations than those indicated in FIG. 3.

Logic optimization refers to technology mapping, datapath architectural selection, algebraic and boolean logic structuring, clock gating, etc. Placement refers to creation of coarsely placed netlist allowing overlapping. Buffer/inverter tree insertion refers to adding buffer/inverter trees to fix large fanouts and transition times. Scan insertion refers to creating scan chain. Physical timing optimization refers to performing gate level timing optimization transformations include sizing, buffering, logic restructuring, debanking, layer promotion, and so on, under placement context. Area/leakage recovery refers to performing gate-level transformations including, sizing, buffer tree removal, restructuring, and so on to improve area and leakage. Gate-level total power optimization refers to gate-level transformations including sizing, remapping, and so on, to improve total power in an incremental way.

The optimizations performed as indicated in FIG. 3 core deliver good correlation for area, power, congestion and timing prediction. In contrast, the optimized digital implementation synthesis process creates placed, optimized and legalized netlist and contains many more placement passes, physical timing optimization passes, area/leakage recovery passes, power optimization passes, skew optimization passes, legalization passes, etc.

In some embodiments, some core optimization step (such as scan insert) is moved to a different place. For example, scan insertion is performed after initial placement and uses output of the initial placement.

The reduced synthesis process performs a single pass of area/leakage recovery. In contrast, the optimized digital implementation synthesis process performs multiple passes of area/leakage recovery.

The reduced synthesis process performs enhanced initial sizing, buffer tree insertion steps and early physical timing optimization to be more leakage efficient and avoid introducing too many leaky cells. The reduced synthesis process performs enhanced timing optimization after first placement, to only process top violating cells with high impact on timing endpoints. Accordingly, the system identifies top violating cells based on an amount of timing violation of each identified cell. The system skips timing optimization of cells not identified as the top violating cells. The reduced synthesis process prunes transformations that have bad tradeoff for timing and area/leakage.

The reduced synthesis process performs a reduced runtime cube and kernel extraction for logic structuring to identify and factor out common logic. The optimized digital implementation synthesis process tries many thresholds for flattening level of logic prior to cube and kernel common logic extraction to expose more common logic, so as to pick the best one. The rationale behind is that some logic circuits benefit from high eliminate threshold values while other circuits benefit from low values. Trying many eliminate threshold values is computationally expensive but performed by optimized digital implementation synthesis process to achieve the best PPA possible. However, the reduced synthesis process reduces this runtime at contained area overhead cost, still meeting the correlation target. The improvement is obtained by a smart bailout procedure when trying an ordered array of eliminate thresholds. Whenever the next eliminate threshold increases the area cost (literals or nand2 eq. count) the system bails out and keeps the previous best eliminate threshold. This enhancement reduced runtime by half and only sacrificed some marginal area opportunities, still retaining correlation for known circuits where high eliminate thresholds are needed to correlate.

The reduced synthesis process performs a simplified version of Boolean optimization based on and-or-inverter graph for logic structuring. The system reduces the cut size for logic cone extraction for key truth-table based optimizations, such as resubstitution with and without don't cares, so that computing and filtering truth tables is substantially faster at acceptable area cost while retaining correlation targets.

The reduced synthesis process performs reduced set of timing transformations as compared to optimized digital implementation synthesis process. The reduced synthesis process maintains key timing transformations for example, collapsing and timing-driven decomposition that help correlate on fundamental timing. The reduced synthesis process skipped timing transformations with marginal gains and also reduces number of passes with diminishing timing optimizations gains.

The reduced synthesis process reduces run-time for area recovery on mapped netlist. The system reduces the number of calls to area recovery engines (sweeping to eliminate equivalent gates) on mapped netlist to only a single invocation after main pre-placement timing optimization is completed (as opposed to two calls performed by optimized digital implementation synthesis process). The reduced synthesis process reduces run-time for redundancy removal on mapped netlist by reducing the effort for the underpinning reasoning engine for redundancy removal (circuit SAT solving) thereby providing notable speedup.

The reduced synthesis process performs the reduced effort timing driven placement from initial placement. The original effort timing driven placement is runtime expensive while the gain is not significant for fast flow to achieve correlation.

The reduced synthesis process runs congestion and timing driven placement only once. Furthermore, within one invocation, reduced synthesis process runs only half the number of passes which are enough for achieving PPA correlation. The optimized digital implementation synthesis process runs congestion and timing driven placement multiple times, with more passes.

The reduced synthesis process skips gate-level total power optimizations since these steps are runtime expensive but only producing incremental total power benefits.

Timing Model

Figure 4:
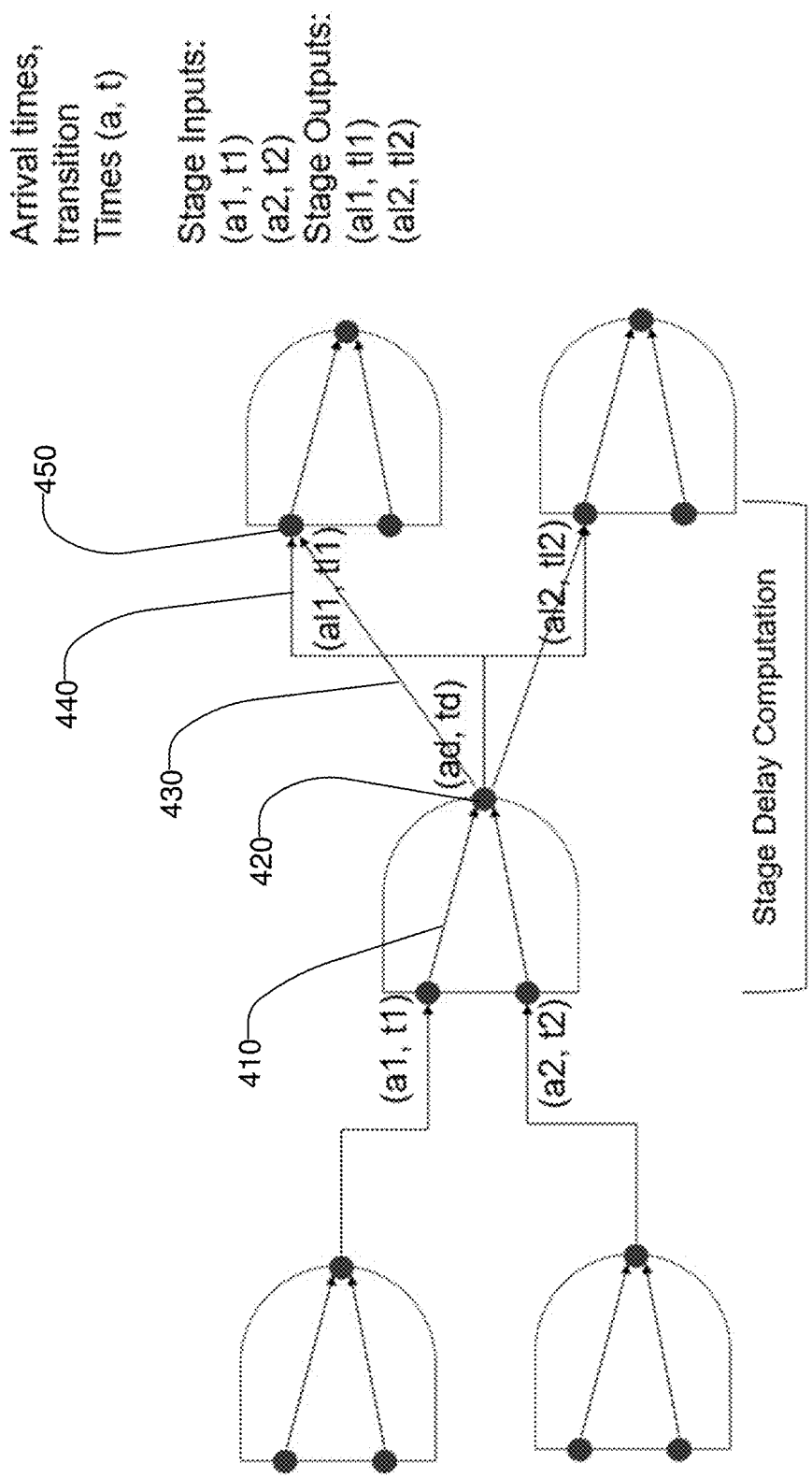
FIG. 4 illustrates an example net illustrating various terms according to an embodiment.

FIG. 4 illustrates an example net illustrating various terms according to an embodiment. FIG. 4 illustrates various elements in a stage delay computation including driver pin arc 410, driver pin 420, net arc 430, net 440, and load pin 450.

In an embodiment, the system uses either an established delay model with context specific scaling or a logical effort based timing model for performing timing analysis of the netlist obtained from the reduced synthesis process. The delay computation process receives several inputs for determining the delay for a netlist including (1) the resistance and capacitance of the wires, (2) the capacitance of the load pins on the wires and (3) the non-linear delay model for the specific drivers of each wire, and (4) input slew The system according to various embodiments performs the delay computation process by (1) Modifying the resistance and capacitance of the wires; (2) Modifying the actual capacitance of the load pins of combinational gates; and (3) Replacing the non-linear delay model with a model that computes the delay if the driver and loads had been optimized well, (4) Modifying the input slew if the netlist has been optimized well.

Figure 5:
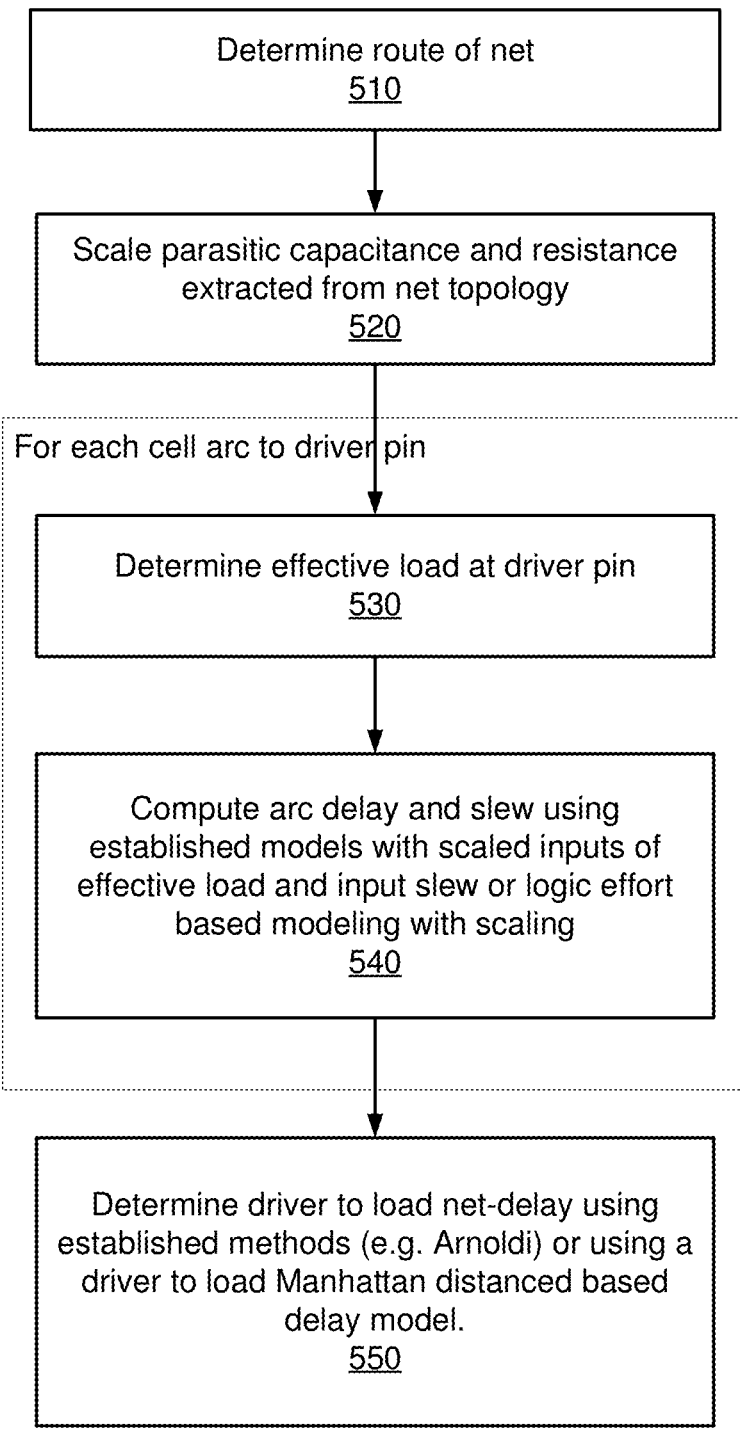
FIG. 5 depicts a flowchart for performing delay analysis of a netlist generated by the reduced synthesis flow according to an embodiment.

FIG. 5 depicts a flowchart for performing delay analysis of a netlist generated by the reduced synthesis flow according to an embodiment. The system determines 510 the route of a net. The system extracts parasitic capacitance and resistance from net topology and scales 520 the extracted parasitic capacitances and resistances. For example, the system scales 520 determined parasitic capacitance and resistance values by a context specific factor to reduce the effective parasitic capacitance and resistance values, thereby reducing their effective delays.

The system further determines worst case arrival and slew to driver pins. For each cell arc to a driver pin, the system performs steps 530 and 540. The system determines 530 arrival time using a timing prediction model that will use either established models for computing 540 delay with scaled inputs of effective load and input slew or logical effort based delay models. The logical effort timing model is distinct from the library arc model used by the optimized digital implementation synthesis process.

The system further determines 550 driver to load net delay based using established methods to compute delay (e.g. Arnoldi) or using Manhattan distance from driver pin to load pin scaled by delay/unit-length scale factor that is derived by analyzing the delays of buffers and inverters in the library.

The process described in FIG. 5 calculates accurate delay values for the circuit design synthesized using the reduced synthesis process.

Other embodiments use other timing models. For example, the timing model may use the result obtained from a library arc model (or any non-linear delay model) and scale the output to adjust the delay for the reduced synthesis flow. For example, the timing model may scale the output of the library arc model to reduce the delay by a context specific factor. In an embodiment, the timing model may use the library arc model but scale the inputs provided to the library arc model, for example, scale the load for a stage provided as input to the library arc model. For example, the timing model may adjust the inputs provided to the library arc model so that the output of the library arc model is reduced. Accordingly, the system may use any timing model and mitigates the effect of the suboptimal netlist generated by the reduced synthesis flow.

In some embodiments, the system scales different stages of the netlist by different amount based on a measure of a degree of optimization of the stage. For example, the system compares attributes of a stage with historical data describing comparable stages generated by the system that were determined to be optimized. If a particular stage has attributes that are more than a threshold different from the typical values of attributes of comparable stages that are determined to be optimized, the system determines that the stage is not optimized. The system uses a measure of difference between the stage attributes and the typical attributes of an optimized stage of similar type as a measure of degree of optimization of the stage of the netlist. The system determines the amount by which the delay for a stage is scaled based on the measure of the degree of optimization of the stage. Accordingly, the system scales down the delay of less optimized stages but may not scale or scale down by a smaller amount for stages that are determined to be well optimized. For example, if the system determines that a stage S1 is more optimized compared to stage S2, the system scales the delay of stage S1 less than the amount by which the system scales the delay of stage S2.

The system may use different models for determining delays of different stages based on a degree of optimization of a stage of the netlist generated by the reduced synthesis process. For example, the system may use library arc model for determining delay of a stage determined to be well optimized and use a logical effort based model for determining delay of a stage determined to be suboptimal.

Technological Improvements

The reduced synthesis process is constructed by improvements in optimization flow and core engines which improve the runtime of the individual engines and the convergence of the overall synthesis flow. This delivers significant runtime speedup of at least 3 to 3.5 times compared to the optimized digital implementation synthesis process. The reduced synthesis process ensures tight area and power correlation with absolute correlation error less than 5%. Embodiments combine timing prediction model with the fast synthesis flow to ensure tight timing correlation for timing endpoint slack correlation. The system achieves high timing endpoint correlation for at least 85% endpoints within 0-15% correlation error for normalized slacks of timing endpoints. The system achieves fast leakage optimization that enables correlation of leakage, which is sub-component of total power, with average absolute leakage correlation error less than 15%. The reduced synthesis process achieves correlation out of the box based on the current RTL design, technology library information, and design constraints. The flow does not require prior runs of optimized digital implementation synthesis process and interpolation of data for new RTL modifications.

The table I shows the accuracy of key design metrics from a suite of 52 circuit designs.

TABLE I

| Design Metric | Average absolute Error |
| --- | --- |
| WNS - Worst Negative Slack | +7% |
| TNS - Total Negative Slack | +6% |
| Total Power - Leakage + Dynamic | 5% |
| Area | 4.2% |

Accordingly, the reduced synthesis process with timing prediction results in accurate correlation of performance, power and area. The average run-time improvement of reduced synthesis process is 3.3 times that of the optimized digital implementation synthesis process.

EDA Process

Figure 6:
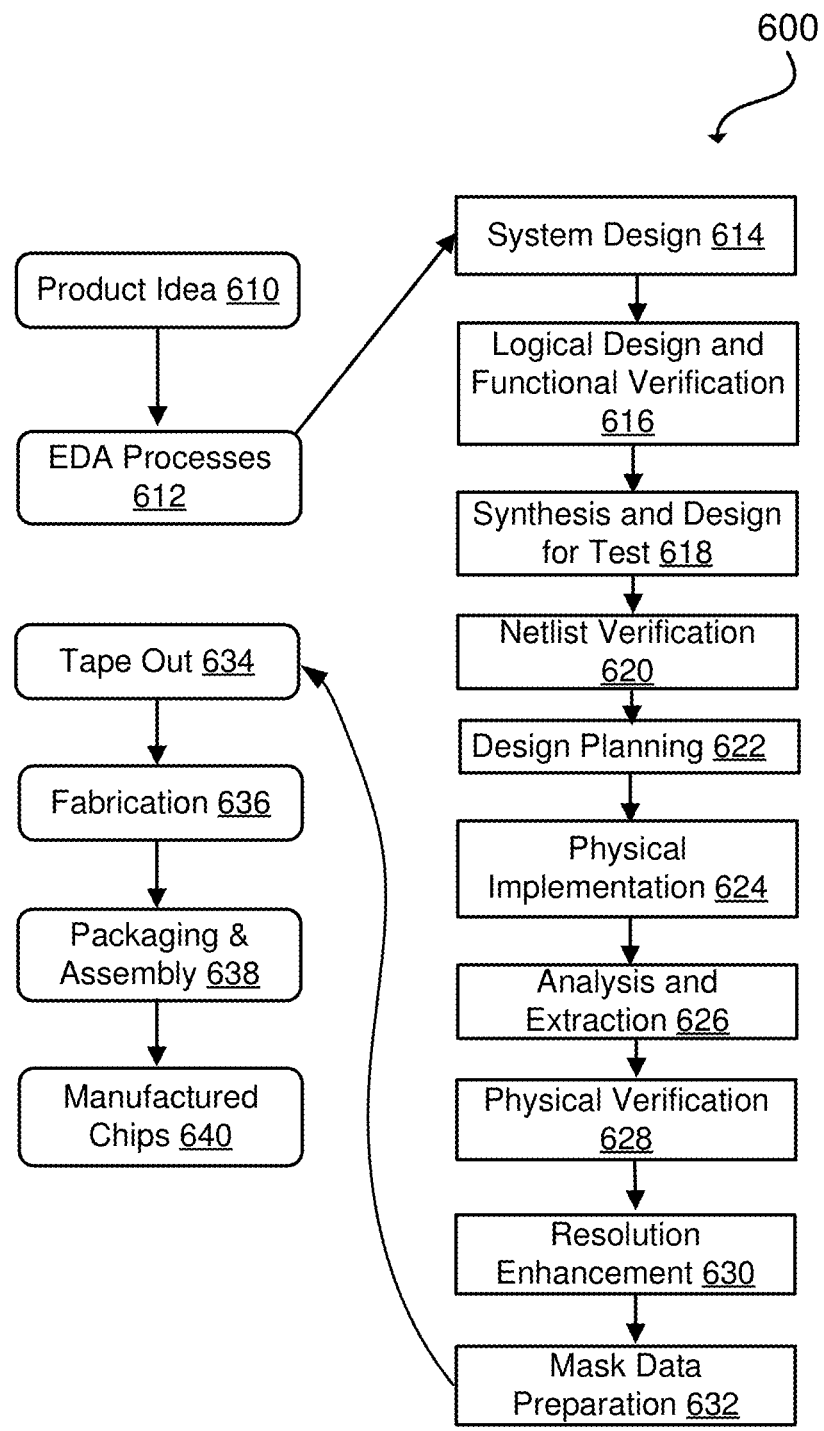
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Computer Architecture

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method comprising:
   receiving a logical design of a circuit of an integrated circuit;
   applying, by a processor, a reduced synthesis process to the logical design of the circuit, the reduced synthesis process generating a netlist having suboptimal delay through one or more stages of the netlist;
   providing the generated netlist as input to a timing prediction delay model that determines delay as a function of timing context of gates and nets of the circuit, wherein the timing prediction delay model determines scale factors used in determining delay based on estimated quality of optimization by the reduced synthesis process of the stages of the generated netlist; and
   executing the timing prediction delay model using the scale factors, to determine an estimate of timing for the logical design of the circuit.

2. The computer-implemented method of claim 1, wherein the reduced synthesis process performs a subset of operations performed by an optimized digital implementation flow and performs fewer iterations for one or more operations of the subset compared to an optimized digital implementation flow.

3. The computer-implemented method of claim 1, wherein the reduced synthesis process comprises:

identifying a set of cells used by the circuit as top violating cells based on an amount of timing violation of each identified cell; and excluding determination of timing optimization of cells not identified as the top violating cells.

4. The computer-implemented method of claim 1, wherein the reduced synthesis process performs cube and kernel extraction using a subset of eliminate threshold values used by an optimized digital implementation flow, wherein the subset is selected by excluding eliminate threshold values that increase an area cost by more than a threshold value.

5. The computer-implemented method of claim 1, wherein the reduced synthesis process performs Boolean optimization by reducing a cut size for truth table based optimization.

6. The computer-implemented method of claim 1, wherein the reduced synthesis process performs a single pass of area/leakage recovery operation.

7. The computer-implemented method of claim 1, wherein reduced synthesis process performs an initial sizing, buffer tree insertion step, and early physical optimization that uses a subset of library cells, wherein the subset of library cells is determined by excluding library cells having leakage exceeding a predetermined threshold.

8. The computer-implemented method of claim 1, wherein the reduced synthesis process performs timing driven physical optimization or timing driven logic optimization using a subset of transformations used in an optimized digital implementation synthesis, wherein the subset is selected by excluding one or more transformations that generate timing gain below a first threshold value and increase at least one of area or power of the circuit by a second threshold value.

9. The computer-implemented method of claim 1, wherein the reduced synthesis process performs an initial placement with reduced effort timing driven placement.

10. The computer-implemented method of claim 1, wherein the reduced synthesis process performs scan insert operation using output of an initial placement step.

11. The computer-implemented method of claim 1, wherein the reduced synthesis process performs a single iteration of congestion driven placement post buffer/inverter tree insertion.

12. The computer-implemented method of claim 1, wherein the reduced synthesis process is performed without gate-level total power optimizations.

13. The computer-implemented method of claim 1, wherein the reduced synthesis process performs a set of steps identified as core steps in a defined order to achieve high correlation results with fast runtime.

14. The computer-implemented method of claim 1, wherein an estimated area, an estimated power, and an estimated timing are within a threshold of corresponding measures determined by an optimized digital implementation process.

15. The computer-implemented method of claim 1, wherein the reduced synthesis process runs at least 3 times faster than an optimized digital implementation process that generates placed, optimized, and legalized netlist.

16. A system comprising:
a memory storing instructions; and
a computer processor, coupled with the memory and to execute the instructions, wherein the instructions when executed cause the computer processor to:
receive a logical design of a circuit of an integrated circuit;
apply a reduced synthesis process to the logical design of the integrated circuit, the reduced synthesis process generating a netlist having suboptimal delay through one or more portions of the netlist, wherein the reduced synthesis process performs cube and kernel extraction using a subset of eliminate threshold values used by an optimized digital implementation flow, wherein the subset is selected by excluding eliminate threshold values that increase an area cost by more than a threshold value;
provide the generated netlist as input to a timing prediction delay model that determines delay as a function of timing context of gates and nets of the circuit; and
execute the timing prediction delay model to determine an estimate of timing for the logical design of the circuit.

17. A non-transitory computer readable medium comprising stored instructions, which when executed by a computer processor, cause the computer processor to:
receive a logical design of a circuit of an integrated circuit;
apply a reduced synthesis process to the logical design of the circuit, the reduced synthesis process generating a netlist having suboptimal delay through one or more stages of the netlist;
provide the generated netlist as input to a timing prediction delay model that determines delay as a function of timing context of gates and nets of the circuit, wherein the timing prediction delay model determines scale factors used in determining delay based on estimated quality of optimization by the reduced synthesis process of the stages of the generated netlist; and
execute the timing prediction delay model using the scale factors, to determine an estimate of timing for the logical design of the circuit.

* * * * *